(No Model.)

O. NOWELL.
Feed Basket.

No. 240,169.  Patented April 12, 1881.

Witnesses:
H. S. Talbot
W. R. Marble

Inventor:
Oliver Nowell,
By Sylvenus Walker
Attorney

UNITED STATES PATENT OFFICE.

OLIVER NOWELL, OF SOMERVILLE, MASSACHUSETTS.

FEED-BASKET.

SPECIFICATION forming part of Letters Patent No. 240,169, dated April 12, 1881.

Application filed December 27, 1880. (No model.)

*To all whom it may concern:*

Be it known that I, OLIVER NOWELL, of Somerville, in the county of Middlesex and State of Massachusetts, have invented certain new and useful Improvements in Feed-Baskets, of which the following is a specification.

The object of my invention is to provide suitable means to render the feed-basket self-adjusting to the mouth of the animal as the quantity of food is reduced therein, so as to retain the food in the proper position to be partaken of freely until the entire contents of such feed bag or basket are consumed; and it consists in the construction, combination, and arrangement of parts, as is hereinafter more fully described and set forth.

Figure 1:
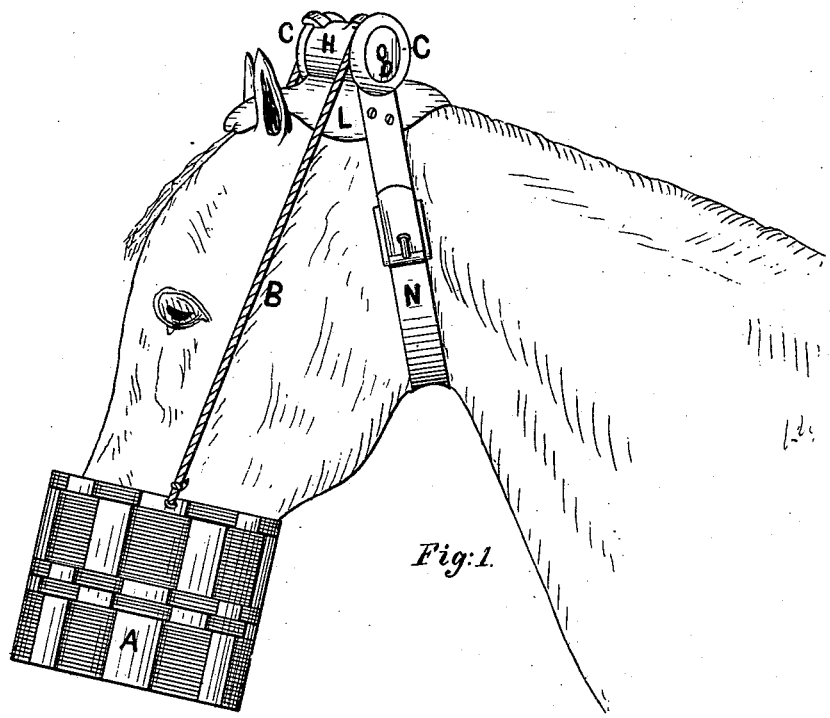
Figure 2:
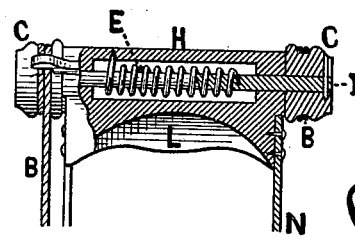

Figure 1 is a perspective view of my invention as applied to a horse's head, when in use. Fig. 2 is a vertical section through the self-adjusting devices.

A represents a feed basket or receptacle for holding the food, to the opposite sides of the mouth of which are secured suitable cords or suspension-straps, B, which extend upward each side of the animal's head and are connected to the pulleys C, which are secured to each end of a rotative horizontal shaft, D, which is provided with a spiral or coiled spring or springs, E, one end or portion of which is connected with the said shaft D and the opposite end with the interior of the tube, cylinder, or case H, secured to the cap-piece L, which rests upon the top of the head of the animal, and is provided with a throat-latch strap or fastening, N, which is provided with a buckle, as heretofore.

It will be understood that the feed-basket A may be drawn downward, thereby coiling more tightly or acting upon the spiral springs E when the weight of the food is placed therein, and as fast as it is consumed the said coiled spring or springs E recoil sufficiently to draw the feed-basket upward, so as to keep the food placed therein in close proximity to the mouth of the animal until the same has been all consumed. By this means the animal can partake of the last or bottom portion of food without throwing up its head and spilling or wasting a portion, which is thrown out over the mouth of the basket, as is common with those of ordinary construction and now in general use for the purpose.

It will be obvious that the case might be dispensed with.

Having thus described my invention, what I claim is—

1. In combination with the feed-receptacle A, having suspension-cords B, the pulleys C, horizontal shaft D, spiral spring E, case H, and cap-piece L, all being constructed and arranged for use as and for the purposes set forth.

2. The combination, with the feed-receptacle A, having suspension-cords B, of the horizontal shaft D, provided with the spiral spring E, as specified, whereby the feed-receptacle is rendered self-adjusting as the food is consumed, substantially as described, as and for the purposes set forth.

OLIVER NOWELL.

Witnesses:
SYLVENUS WALKER,
E. A. ROBBINS.